US008848553B2

(12) United States Patent
Song et al.

(10) Patent No.: US 8,848,553 B2
(45) Date of Patent: Sep. 30, 2014

(54) ASSISTED STATE TRANSITIONS OF A USER EQUIPMENT WITHIN A WIRELESS COMMUNICATIONS SYSTEM

(75) Inventors: Bongyong Song, San Diego, CA (US); Yih-Hao Lin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 635 days.

(21) Appl. No.: 13/012,308

(22) Filed: Jan. 24, 2011

(65) Prior Publication Data

US 2011/0194436 A1   Aug. 11, 2011

Related U.S. Application Data

(60) Provisional application No. 61/301,919, filed on Feb. 5, 2010.

(51) Int. Cl.
  *H04W 72/04* (2009.01)
  *H04L 12/26* (2006.01)
  *H04W 88/06* (2009.01)
  *H04W 76/04* (2009.01)
  *H04W 28/06* (2009.01)
  *H04W 72/02* (2009.01)
  *H04W 76/02* (2009.01)

(52) U.S. Cl.
  CPC .......... *H04W 88/06* (2013.01); *H04W 76/046* (2013.01); *H04W 28/06* (2013.01); *H04W 72/02* (2013.01); *H04W 76/025* (2013.01)
  USPC ............................ 370/252; 370/329; 455/450

(58) Field of Classification Search
  CPC ... H04W 76/046; H04W 88/02; H04W 72/02; H04W 76/025
  See application file for complete search history.

(56) References Cited

U.S. PATENT DOCUMENTS

| 7,099,346 B1 | 8/2006 | Kanterakis |
| 7,539,160 B2 | 5/2009 | Virtanen et al. |

(Continued)

FOREIGN PATENT DOCUMENTS

| CN | 1284394 C | 11/2006 |
| CN | 101095363 A | 12/2007 |

(Continued)

OTHER PUBLICATIONS

Ericsson et al., "Direct transition to DCH", 3GPP Draft, R2-051183 Agreed CR to 25331 [REL-6] on Direct Transition to DCH, 3rd Generation Partnership Project (3GPP), Mobile Competence Centre, 650, Route Des Lucioles, F-06921 Sophia-Antipolis Cedex, France, vol. RAN WG2, No. Beijing, china, Apr. 11, 2005, XP050128340, [retrieved on Apr. 11, 2005].

(Continued)

*Primary Examiner* — Min Jung
(74) *Attorney, Agent, or Firm* — Michael F. Taveira

(57) ABSTRACT

In an embodiment, a user equipment (UE) determines to initiate a communication session with at least one other UE to be arbitrated by an application server. The UE determines a type of the communication session (e.g., delay-sensitive, PTT, etc.) and/or a size of a call message to be sent by the UE for requesting initiation of the communication session by the application server. The UE selects a reverse-link channel on which to transmit the call message based at least in part upon the determined type of the communication session and/or the determined size of the call message. The UE transitions to a given state (e.g., CELL_FACH, CELL_DCH, etc.) that supports transmissions upon the selected reverse-link channel. The UE transmits the call message on the selected reverse-link channel after the UE is transitioned to the given state.

40 Claims, 8 Drawing Sheets

(56) References Cited

U.S. PATENT DOCUMENTS

| | | | |
|---|---|---|---|
| 7,664,517 B2 | 2/2010 | Ananthanarayanan et al. | |
| 7,680,478 B2 | 3/2010 | Willars et al. | |
| 7,792,079 B2 | 9/2010 | Choi et al. | |
| 7,925,290 B2 | 4/2011 | Rosen et al. | |
| 8,125,962 B2 | 2/2012 | Charpentier et al. | |
| 8,160,628 B1 | 4/2012 | Tailor et al. | |
| 8,351,358 B2* | 1/2013 | Ketheesan et al. | 370/310 |
| 2002/0173326 A1 | 11/2002 | Rosen et al. | |
| 2004/0117504 A1 | 6/2004 | Pedersen et al. | |
| 2004/0180675 A1 | 9/2004 | Choi et al. | |
| 2005/0141541 A1 | 6/2005 | Cuny et al. | |
| 2005/0250504 A1 | 11/2005 | Mikola | |
| 2006/0146743 A1 | 7/2006 | Crocker et al. | |
| 2006/0148535 A1 | 7/2006 | Schaefer et al. | |
| 2006/0271636 A1 | 11/2006 | Balasuriya | |
| 2007/0060153 A1* | 3/2007 | Torsner et al. | 455/450 |
| 2007/0147370 A1 | 6/2007 | Hasegawa | |
| 2007/0177628 A1 | 8/2007 | Choi et al. | |
| 2007/0192439 A1 | 8/2007 | Bhaskaran | |
| 2007/0206595 A1 | 9/2007 | Herrero-Veron et al. | |
| 2008/0170563 A1 | 7/2008 | Zhu et al. | |
| 2008/0182594 A1* | 7/2008 | Flore et al. | 455/458 |
| 2009/0023436 A1 | 1/2009 | Wu | |
| 2009/0028084 A1 | 1/2009 | Ping | |
| 2009/0203331 A1 | 8/2009 | Ranalli et al. | |
| 2009/0257378 A1 | 10/2009 | Cuny et al. | |
| 2009/0303909 A1 | 12/2009 | Farhoudi et al. | |
| 2009/0325621 A1 | 12/2009 | Rossotto et al. | |
| 2010/0015974 A1 | 1/2010 | Stubbings | |
| 2010/0029315 A1 | 2/2010 | Ikeda | |
| 2010/0158231 A1 | 6/2010 | Newberg et al. | |
| 2010/0254340 A1 | 10/2010 | Park et al. | |
| 2010/0260108 A1 | 10/2010 | Song et al. | |
| 2011/0086656 A1 | 4/2011 | Zhou | |
| 2011/0122783 A1 | 5/2011 | Lin et al. | |
| 2011/0134757 A1 | 6/2011 | Lin et al. | |
| 2011/0134836 A1 | 6/2011 | Lin et al. | |
| 2011/0134888 A1 | 6/2011 | Lin et al. | |
| 2011/0149787 A1* | 6/2011 | DiGirolamo et al. | 370/252 |
| 2011/0151944 A1 | 6/2011 | Morgan | |
| 2011/0194433 A1 | 8/2011 | Song et al. | |
| 2011/0194437 A1 | 8/2011 | Song et al. | |
| 2012/0026903 A1 | 2/2012 | Song et al. | |
| 2012/0033626 A1 | 2/2012 | Dwyer et al. | |
| 2012/0188965 A1* | 7/2012 | Pani et al. | 370/329 |
| 2012/0202497 A1 | 8/2012 | Yan et al. | |
| 2013/0188543 A1* | 7/2013 | Dwyer et al. | 370/311 |
| 2013/0315181 A1 | 11/2013 | Song et al. | |

FOREIGN PATENT DOCUMENTS

| | | |
|---|---|---|
| EP | 2152031 | 2/2010 |
| GB | 2377585 A | 1/2003 |
| JP | 2004007652 A | 1/2004 |
| JP | 2004289841 A | 10/2004 |
| JP | 2007174471 A | 7/2007 |
| JP | 2007214711 A | 8/2007 |
| JP | 2007522763 A | 8/2007 |
| JP | 2007267150 A | 10/2007 |
| JP | 2008519515 A | 6/2008 |
| JP | 2009273185 A | 11/2009 |
| JP | 2010041324 A | 2/2010 |
| WO | WO9966748 A1 | 12/1999 |
| WO | WO2005079085 A1 | 8/2005 |
| WO | WO2009145521 A2 | 12/2009 |
| WO | WO2010135312 A2 | 11/2010 |

OTHER PUBLICATIONS

International Search Report and Written Opinion—PCT/US2011/023431—ISA/EPO—Apr. 21, 2011.

Nokia Corporation et al., "TCTV measurement correction to support direct transition to DCH", 3GPP Draft, 25331_CRXXXX (REL8) R2-094982, 3rd Generation Partnership Project (3GPP), Mobile Competence Centre, 650, Route Des Lucioles, F-06921 Sophia-Antipolis Cedex, France, No. Shenzhen, China, Aug. 24, 2009, XP050389612, [retrieved on Aug. 21, 2009].

* cited by examiner

US 8,848,553 B2

ASSISTED STATE TRANSITIONS OF A USER EQUIPMENT WITHIN A WIRELESS COMMUNICATIONS SYSTEM

CLAIM OF PRIORITY UNDER 35 U.S.C. §119

The present application for patent claims priority to Provisional Application No. 61/301,919 entitled "ASSISTED STATE TRANSITIONS OF A USER EQUIPMENT WITHIN A WIRELESS COMMUNICATIONS SYSTEM", filed Feb. 5, 2010, and assigned to the assignee hereof and hereby expressly incorporated by reference herein.

BACKGROUND OF THE INVENTION

1. Field of the Invention

Embodiments of the invention relate to assisted state transitions of a user equipment (UE) within a wireless communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (W-CDMA), CDMA2000 (such as CDMA2000 1xEV-DO standards, for example) or TD-SCDMA.

In W-CDMA wireless communication systems, user equipments (UEs) receive signals from fixed position Node Bs (also referred to as cell sites or cells) that support communication links or service within particular geographic regions adjacent to or surrounding the base stations. Node Bs provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the Node Bs generally interacts with UEs through an over the air interface and with the RAN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as W-CDMA, CDMA, FDMA, TDMA, GSM, etc. In a dispatch model, communication between endpoints (e.g., UEs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

SUMMARY

In an embodiment, a user equipment (UE) determines to initiate a communication session with at least one other UE to be arbitrated by an application server. The UE determines a type of the communication session (e.g., delay-sensitive, PTT, etc.) and/or a size of a call message to be sent by the UE for requesting initiation of the communication session by the application server. The UE selects a reverse-link channel on which to transmit the call message based at least in part upon the determined type of the communication session and/or the determined size of the call message. The UE transitions to a given state (e.g., CELL_FACH, CELL_DCH, etc.) that supports transmissions upon the selected reverse-link channel. The UE transmits the call message on the selected reverse-link channel after the UE is transitioned to the given state.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
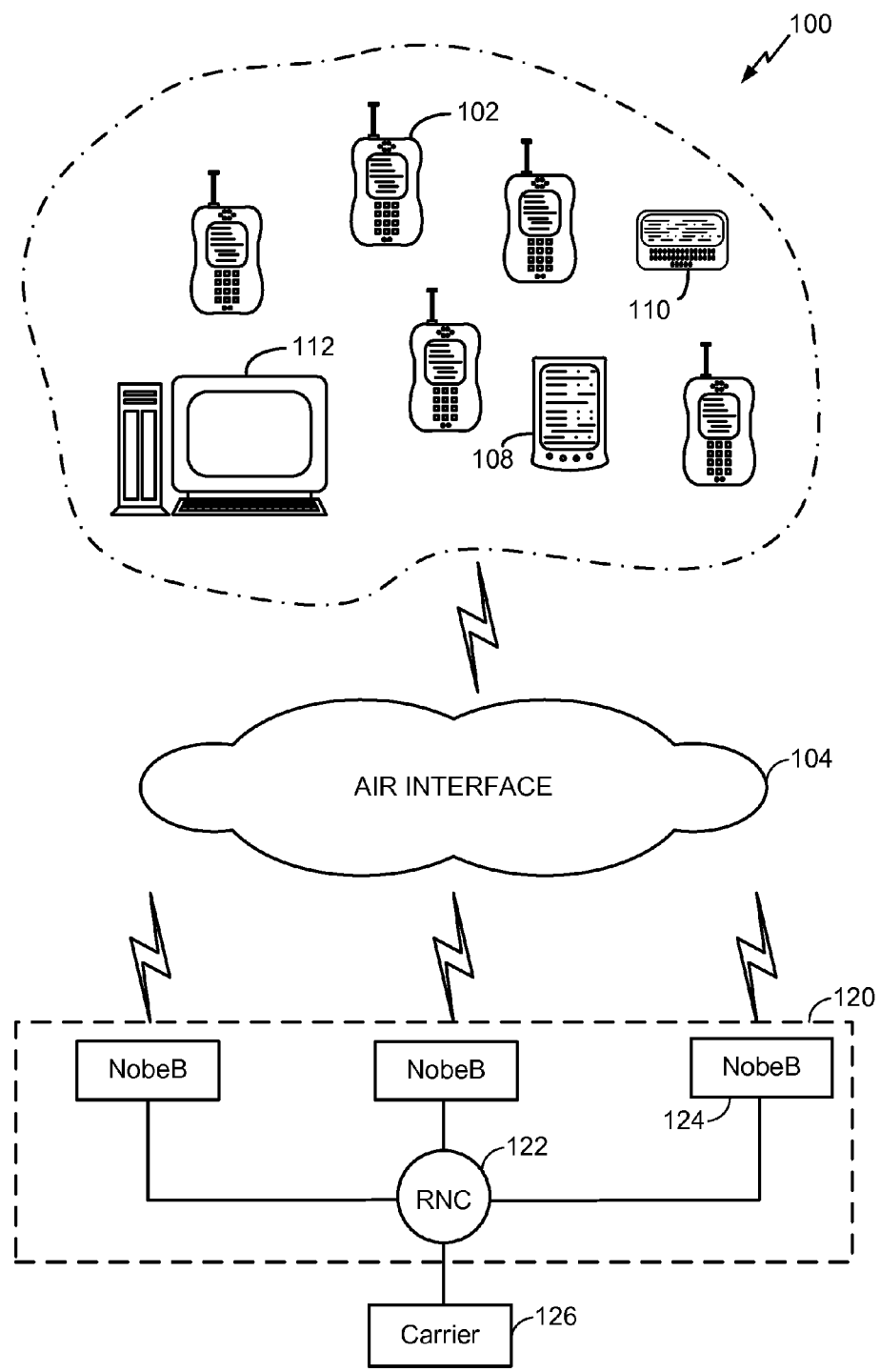
FIG. 1 is a diagram of a wireless network architecture that supports user equipments and radio access networks in accordance with at least one embodiment of the invention.

Aspects of the invention are disclosed in the following description and related drawings directed to specific embodiments of the invention. Alternate embodiments may be devised without departing from the scope of the invention.

Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple UEs.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of one exemplary embodiment of a wireless communications system 100 in accordance with at least one embodiment of the invention. System 100 can contain UEs, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal", "AT", "wireless device", "client device", "mobile terminal", "mobile station" and variations thereof.

Referring back to FIG. 1, the components of the wireless communications system 100 and interrelation of the elements of the exemplary embodiments of the invention are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the invention is not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2A:
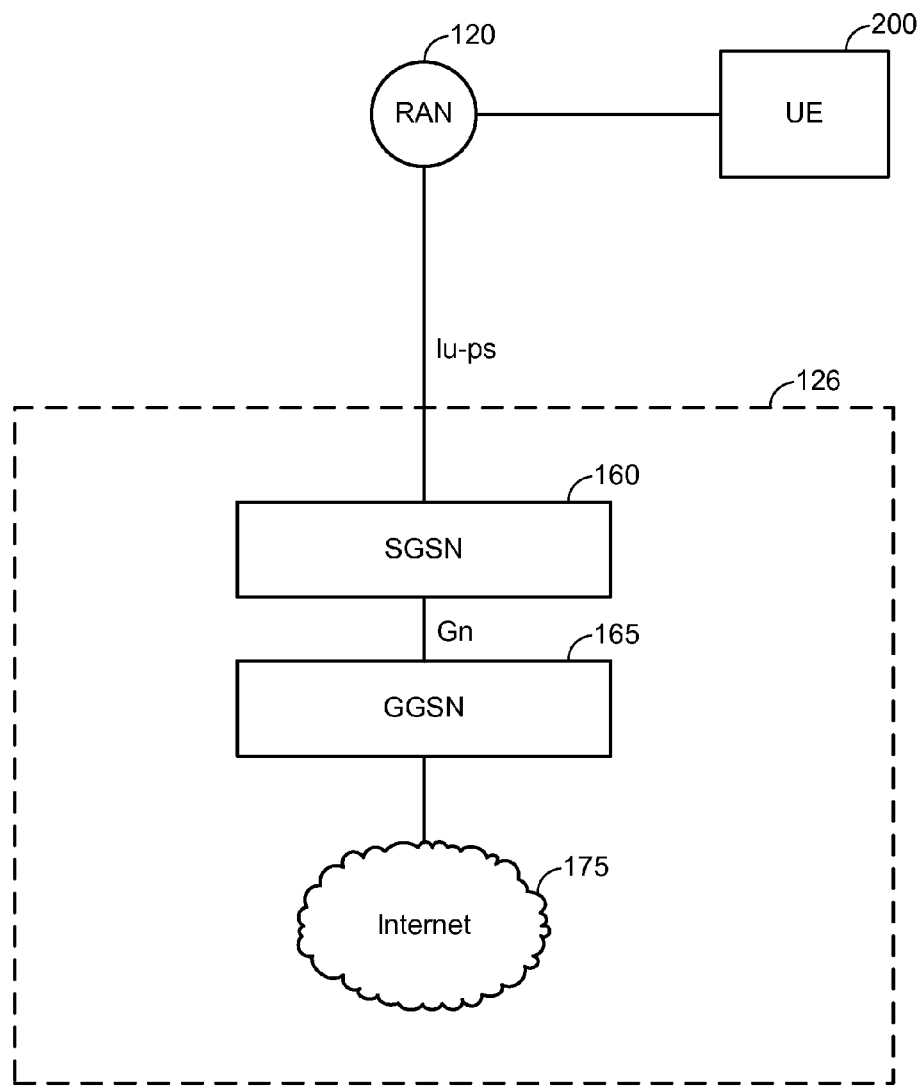
FIG. 2A illustrates the core network of FIG. 1 according to an embodiment of the present invention.

FIG. 2A illustrates the core network 126 according to an embodiment of the present invention. In particular, FIG. 2A illustrates components of a General Packet Radio Services (GPRS) core network implemented within a W-CDMA system. In the embodiment of FIG. 2A, the core network 126 includes a Serving GPRS Support Node (SGSN) 160, a Gateway GPRS Support Node (GGSN) 165 and an Internet 175. However, it is appreciated that portions of the Internet 175 and/or other components may be located outside the core network in alternative embodiments.

Generally, GPRS is a protocol used by Global System for Mobile communications (GSM) phones for transmitting Internet Protocol (IP) packets. The GPRS Core Network (e.g., the GGSN 165 and one or more SGSNs 160) is the centralized part of the GPRS system and also provides support for W-CDMA based 3G networks. The GPRS core network is an integrated part of the GSM core network, provides mobility management, session management and transport for IP packet services in GSM and W-CDMA networks.

The GPRS Tunneling Protocol (GTP) is the defining IP protocol of the GPRS core network. The GTP is the protocol which allows end users (e.g., access terminals) of a GSM or W-CDMA network to move from place to place while continuing to connect to the internet as if from one location at the GGSN 165. This is achieved transferring the subscriber's data from the subscriber's current SSGN 160 to the GGSN 165, which is handling the subscriber's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2A, the GGSN 165 acts as an interface between the GPRS backbone network (not shown) and the external packet data network 175. The GGSN 165 extracts the packet data with associated packet data protocol (PDP) format (e.g., IP or PPP) from the GPRS packets coming from the SGSN 160, and sends the packets out on a corresponding packet data network. In the other direction, the incoming data packets are directed by the GGSN 165 to the SGSN 160 which manages and controls the Radio Access Bearer (RAB) of the destination UE served by the RAN 120. Thereby, the GGSN 165 stores the current SGSN address of the target UE and his/her profile in its location register (e.g., within a PDP context). The GGSN is responsible for IP address assignment and is the default router for the connected UE. The GGSN also performs authentication and charging functions.

The SGSN 160 is representative of one of many SGSNs within the core network 126, in an example. Each SGSN is responsible for the delivery of data packets from and to the UEs within an associated geographical service area. The tasks of the SGSN 160 includes packet routing and transfer, mobility management (e.g., attach/detach and location management), logical link management, and authentication and charging functions. The location register of the SGSN stores location information (e.g., current cell, current VLR) and user profiles (e.g., IMSI, PDP address(es) used in the packet data network) of all GPRS users registered with the SGSN 160, for example, within one or more PDP contexts for each user or UE. Thus, SGSNs are responsible for (i) de-tunneling downlink GTP packets from the GGSN 165, (ii) uplink tunnel IP packets toward the GGSN 165, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in Universal Mobile Telecommunications System (UMTS) system architecture) communicates with the SGSN 160 via a Iu interface, with a transmission protocol such as Frame Relay or IP. The SGSN 160 communicates with the GGSN 165 via a Gn interface, which is an IP-based interface between SGSN 160 and other SGSNs (not shown) and internal GGSNs, and uses the GTP protocol defined above (e.g., GTP-U, GTP-C, GTP', etc.). While not shown in FIG. 2A, the Gn interface is also used by the Domain Name System (DNS). The GGSN 165 is connected to a Public Data Network (PDN) (not shown), and in turn to the Internet 175, via a Gi interface with IP protocols either directly or through a Wireless Application Protocol (WAP) gateway.

The PDP context is a data structure present on both the SGSN 160 and the GGSN 165 which contains a particular UE's communication session information when the UE has an active GPRS session. When a UE wishes to initiate a GPRS communication session, the UE must first attach to the SGSN 160 and then activate a PDP context with the GGSN 165. This allocates a PDP context data structure in the SGSN 160 that the subscriber is currently visiting and the GGSN 165 serving the UE's access point.

Figure 2B:
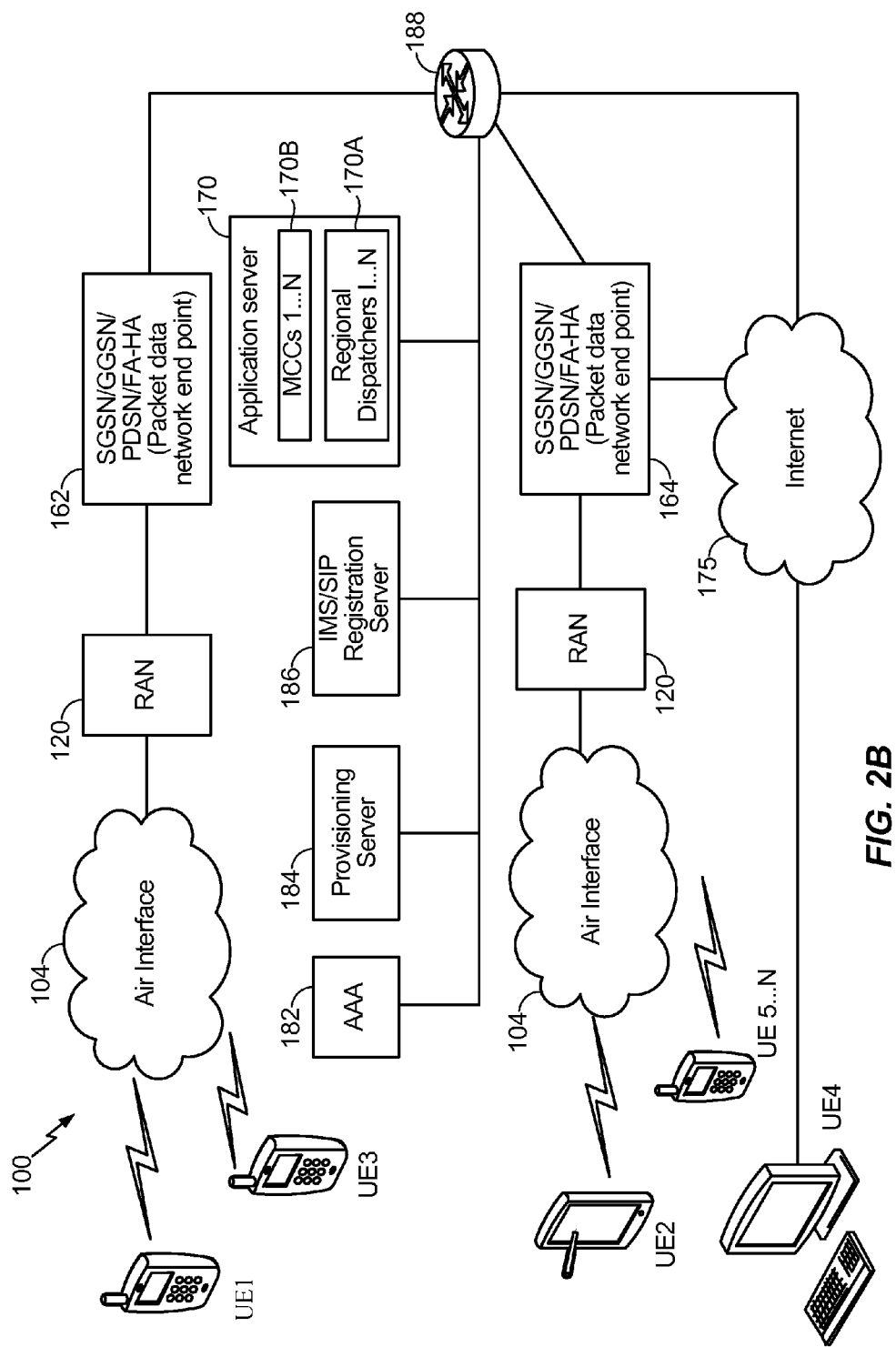
FIG. 2B illustrates an example of the wireless communications system of FIG. 1 in more detail.

FIG. 2B illustrates an example of the wireless communications system 100 of FIG. 1 in more detail. In particular, referring to FIG. 2B, UEs 1 . . . N are shown as connecting to the RAN 120 at locations serviced by different packet data network end-points. The illustration of FIG. 2B is specific to W-CDMA systems and terminology, although it will be appreciated how FIG. 2B could be modified to confirm with a 1×EV-DO system. Accordingly, UEs 1 and 3 connect to the RAN 120 at a portion served by a first packet data network end-point 162 (e.g., which may correspond to SGSN, GGSN, PDSN, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. UEs 2 and 5 . . . N connect to the RAN 120 at a portion served by a second packet data network end-point 164 (e.g., which may correspond to SGSN, GGSN, PDSN, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. UE 4 connects directly to the Internet 175, and through the Internet 175 can then connect to any of the system components described above.

Referring to FIG. 2B, UEs 1, 3 and 5 . . . N are illustrated as wireless cell-phones, UE 2 is illustrated as a wireless tablet-PC and UE 4 is illustrated as a wired desktop station. However, in other embodiments, it will be appreciated that the wireless communication system 100 can connect to any type of UE, and the examples illustrated in FIG. 2B are not intended to limit the types of UEs that may be implemented within the system. Also, while the AAA 182, the provisioning server 184, the IMS/SIP registration server 186 and the application server 170 are each illustrated as structurally separate servers, one or more of these servers may be consolidated in at least one embodiment of the invention.

Further, referring to FIG. 2B, the application server 170 is illustrated as including a plurality of media control complexes (MCCs) 1 ... N 170B, and a plurality of regional dispatchers 1 ... N 170A. Collectively, the regional dispatchers 170A and MCCs 170B are included within the application server 170, which in at least one embodiment can correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 can theoretically take place between UEs located anywhere within the system 100, multiple regional dispatchers 170A and MCCs are distributed to reduce latency for the arbitrated communication sessions (e.g., so that a MCC in North America is not relaying media back-and-forth between session participants located in China). Thus, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the UEs, scheduling and/or sending announce messages, etc.), whereas the MCCs 170B are responsible for hosting the communication session for the duration of the call instance, including conducting an in-call signaling and an actual exchange of media during an arbitrated communication session.

Figure 3:
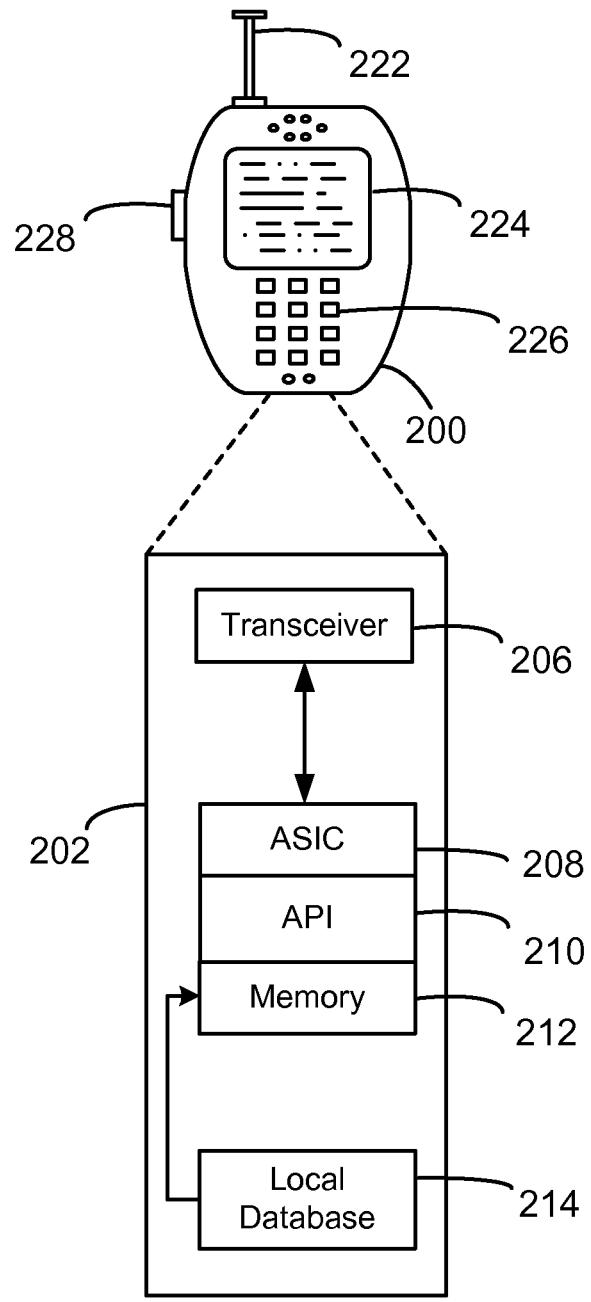
FIG. 3 is an illustration of user equipment in accordance with at least one embodiment of the invention.

Referring to FIG. 3, a UE 200, (here a wireless device), such as a cellular telephone, has a platform 202 that can receive and execute software applications, data and/or commands transmitted from the RAN 120 that may ultimately come from the core network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3 are to be considered merely illustrative and the invention is not limited to the illustrated features or arrangement.

The wireless communication between the UE 102 or 200 and the RAN 120 can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. For example, in W-CDMA, the data communication is typically between the client device 102, Node B(s) 124, and the RNC 122. The RNC 122 can be connected to multiple data networks such as the core network 126, PSTN, the Internet, a virtual private network, a SGSN, a GGSN and the like, thus allowing the UE 102 or 200 access to a broader communication network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Below, embodiments of the invention are generally described in accordance with W-CDMA protocols and associated terminology (e.g., such as UE instead of mobile station (MS), mobile unit (MU), access terminal (AT), etc., RNC, contrasted with BSC in EV-DO, or Node B, contrasted with BS or MPT/BS in EV-DO, etc.). However, it will be readily appreciated by one of ordinary skill in the art how the embodiments of the invention can be applied in conjunction with wireless communication protocols other than W-CDMA.

In a conventional server-arbitrated communication session (e.g., via half-duplex protocols, full-duplex protocols, VoIP, a group session over IP unicast, a group session over IP multicast, a push-to-talk (PTT) session, a push-to-transfer (PTX) session, etc.), a session or call originator sends a request to initiate a communication session to the application server 170, which then forwards a call announcement message to the RAN 120 for transmission to one or more targets of the call.

User Equipments (UEs), in a Universal Mobile Telecommunications Service (UMTS) Terrestrial Radio Access Network (UTRAN) (e.g., the RAN 120) may be in either an idle mode or a radio resource control (RRC) connected mode.

Based on UE mobility and activity while in a RRC connected mode, the RAN 120 may direct UEs to transition between a number of RRC sub-states; namely, CELL_PCH, URA_PCH, CELL_FACH, and CELL_DCH states, which may be characterized as follows:

In the CELL_DCH state, a dedicated physical channel is allocated to the UE in uplink and downlink, the UE is known on a cell level according to its current active set, and the UE has been assigned dedicated transport channels, downlink and uplink (TDD) shared transport channels, and a combination of these transport channels can be used by the UE.

In the CELL_FACH state, no dedicated physical channel is allocated to the UE, the UE continuously monitors a forward access channel (FACH), the UE is assigned a default common or shared transport channel in the uplink (e.g., a random access channel (RACH), which is a contention-based channel with a power ramp-up procedure to acquire the channel and to adjust transmit power) that the UE can transmit upon according to the access procedure for that transport channel, the position of the UE is known by RAN 120 on a cell level according to the cell where the UE last made a previous cell update, and, in TDD mode, one or several USCH or DSCH transport channels may have been established.

In the CELL_PCH state, no dedicated physical channel is allocated to the UE, the UE selects a PCH with the algorithm, and uses DRX for monitoring the selected PCH via an associated PICH, no uplink activity is possible and the position of the UE is known by the RAN 120 on cell level according to the cell where the UE last made a cell update in CELL_FACH state.

In the URA_PCH state, no dedicated channel is allocated to the UE, the UE selects a PCH with the algorithm, and uses DRX for monitoring the selected PCH via an associated PICH, no uplink activity is possible, and the location of the UE is known to the RAN 120 at a Registration area level according to the UTRAN registration area (URA) assigned to the UE during the last URA update in CELL_FACH state.

Accordingly, URA_PCH State (or CELL_PCH State) corresponds to a dormant state where the UE periodically wakes up to check a paging indicator channel (PICH) and, if needed, the associated downlink paging channel (PCH), and it may enter CELL_FACH state to send a Cell Update message for the following event: cell reselection, periodical cell update, uplink data transmission, paging response, re-entered service area. In CELL_FACH State, the UE may send messages on the random access channel (RACH), and may monitor a forward access channel (FACH). The FACH carries downlink communication from the RAN 120, and is mapped to a secondary common control physical channel (S-CCPCH). From CELL_FACH State, the UE may enter CELL_DCH state after a traffic channel (TCH) has been obtained based on messaging in CELL_FACH state. A table showing conventional dedicated traffic channel (DTCH) to transport channel mappings in radio resource control (RRC) connected mode, is in Table 1 as follows:

TABLE 1

DTCH to Transport Channel mappings in RRC connected mode

|  | RACH | FACH | DCH | E-DCH | HS-DSCH |
| --- | --- | --- | --- | --- | --- |
| CELL_DCH | No | No | Yes | Yes | Yes |
| CELL_FACH | Yes | Yes | No | Yes (rel. 8) | Yes (rel. 7) |
| CELL_PCH | No | No | No | No | Yes (rel. 7) |
| URA_PCH | No | No | No | No | No | wherein the notations (rel. 8) and (rel. 7) indicate the associated 3GPP release where the indicated channel was introduced for monitoring or access.

Communication sessions arbitrated by the application server 170, in at least one embodiment, may be associated with delay-sensitive or high-priority applications and/or services. For example, the application server 170 may correspond to a PTT server in at least one embodiment, and it will be appreciated that an important criterion in PTT sessions is fast session set-up as well as maintaining a given level of Quality of Service (QoS) throughout the session.

As discussed above, in RRC connected mode, a given UE can operate in either CELL_DCH or CELL_FACH to exchange data with the RAN 120, through which the given UE can reach the application server 170. As noted above, in CELL_DCH state, uplink/downlink Radio bearers will consume dedicated physical channel resources (e.g., UL DCH, DL DCH, E-DCH, F-DPCH, HS-DPCCH etc). Some of these resources are even consumed for high speed shared channel (i.e., HSDPA) operations. In CELL_FACH state, uplink/downlink Radio bearers will be mapped to common transport channels (RACH/FACH). Thereby, in CELL_FACH state there is no consumption of dedicated physical channel resources.

Conventionally, the RAN 120 transitions the given UE between CELL_FACH and CELL_DCH based substantially on traffic volume, which is either measured at the RAN 120 (e.g., at the serving RNC 122 at the RAN 120) or reported from the given UE itself in one or more measurement reports. Specifically, the RAN 120 can conventionally be configured to transition a particular UE to CELL_DCH state from CELL_FACH state when the UE's associated traffic volume as measured and/or reported in the uplink or as measured and/or reported in the downlink is higher than the one or more of the Event 4a thresholds used by the RAN 120 for making CELL_DCH state transition decisions.

Conventionally, when an originating UE attempts to send a call request message to the application server 170 to initiate a communication session, the originating UE performs a cell update procedure, after which the originating UE transitions to either CELL_FACH state or CELL_DCH state. If the originating UE transitions to CELL_FACH state, the originating UE can transmit the call request message on the RACH to the RAN 120. Otherwise, if the originating UE transitions to CELL_DCH state, the originating UE can transmit the call request message on the reverse-link DCH or E-DCH to the RAN 120. Call request messages are generally relatively small in size, and are not typically expected to exceed the Event 4a threshold(s) used by the RAN 120 in determining whether to transition the originating UE to CELL_DCH state.

In CELL_FACH state, the originating UE can begin transmission of the call request message more quickly (e.g., because no radio link (RL) need be established between a serving Node B and serving RNC at the RAN 120, no L1 synchronization procedure need be performed between the originating UE and the serving Node B, etc.) and no DCH-resources are consumed by the originating UE. However, the RACH is generally associated with lower data rates as compared to the DCH or E-DCH. Thus, while potentially permitting the transmission of the call request message to start earlier at an earlier point in time, the transmission of the call request message on the RACH may take a longer time to complete as compared to a similar transmission on the DCH or E-DCH in some instances. Accordingly, it is generally more efficient for the originating UE to send higher traffic volumes on the DCH or E-DCH as compared to the RACH, while smaller messages can be sent with relative efficiency on the RACH without incurring overhead from DCH set-up.

As noted above, the originating UE's state (e.g., CELL_DCH or CELL_FACH) is determined based on the amount of uplink data to be sent by the originating UE. For example, the standard defines an Event 4a threshold for triggering a Traffic Volume Measurement (TVM) report. The Event 4a threshold is specified in the standard, and is used by the UE for triggering Traffic Volume Measurement Report, which summarizes the buffer occupancy of each uplink Radio Bearer.

Other parameters which are not defined in the standard are an uplink Event 4a threshold for triggering the state transition of a given UE to CELL_DCH state, and a downlink Event 4a threshold for triggering the state transition of the given UE to CELL_DCH state. As will be appreciated, the uplink and downlink Event 4a thresholds being 'undefined' in the standard means that the respective thresholds can vary from vendor to vendor, or from implementation to implementation at different RANs.

Referring to the uplink Event 4a threshold, in CELL_FACH state, if the reported uplink buffer occupancy of each Radio Bearer exceeds the uplink Event 4a threshold, the RNC 122 moves the UE to CELL_DCH. In an example, this decision may be made based on the aggregated buffer occupancy or individual Radio Bearer buffer occupancy. If aggregated buffer occupancy is used for deciding the CELL_DCH transition, the same threshold for triggering TVM can be used. Similarly, referring to the downlink Event 4a threshold, in CELL_FACH state, if the downlink buffer occupancy of the Radio Bearers of the UE exceeds the downlink Event 4a threshold, the RNC 122 moves the UE to CELL_DCH state. In an example, this decision may be done based on the aggregated buffer occupancy or individual Radio Bearer buffer occupancy.

Accordingly, the size of the call request message can determine whether the originating UE is transitioned to CELL_FACH state or CELL_DCH state. Specifically, one of the Event 4a thresholds is conventionally used to make the CELL_DCH state determination at the RAN 120. Thus, when the Event 4a threshold is exceeded, the RAN 120 triggers the CELL_DCH state transition of the UE.

However, the processing speed or responsiveness of the RAN 120 itself can also affect whether the CELL_DCH state or CELL_FACH state is a more efficient option for transmitting the call request message. For example, if the RAN 120 is capable of allocating DCH resources to an originating UE within 10 milliseconds (ms) after receiving a cell update message, the CELL_DCH state transition of the originating UE may be relatively fast so that transitions to DCH may be suitable for transmitting delay-sensitive call request messages. On the other hand, if the RAN 120 is capable of allocating DCH resources to an originating UE only after 100 milliseconds (ms) after receiving a cell update message, the CELL_DCH state transition of the originating UE may be relatively slow, so that the transmission of the call request message may actually be completed faster on the RACH.

As will be appreciated, the Event 4a threshold(s) are typically set high enough to achieve efficient resource utilization, as lower Event 4a thresholds will cause more frequent DCH resource allocations to UEs that do not necessarily require DCHs to complete their data exchange in a timely manner. However, it is possible that data transmissions that do not exceed the Event 4a threshold can be transmitted more quickly either in CELL_FACH state or CELL_DCH state based on the processing speed of the RAN 120 and the amount of data to be transmitted. However, as noted above, conventional RANs do not evaluate criteria aside from whether measured or reported traffic volume exceeds the Event 4a threshold(s) in making the CELL_DCH state transition determination.

In W-CDMA Rel. 6, a new feature referred to as a Traffic Volume Indicator (TVI) is introduced, whereby the originating UE has the option of including the TVI within the cell update message during a cell update procedure. The RAN 120 will interpret a cell update message including the TVI (i.e., TVI=True) as if the Event 4a threshold for triggering a TVM report was exceeded (i.e., in other words, as if the uplink traffic volume buffer occupancy exceeds the Event 4a threshold for triggering a TVM report), such that the RAN 120 will transition the originating UE directly to the CELL_DCH state. Alternatively, if the TVI is not included in the cell update message, the RAN 120 will only transition the originating UE to CELL_DCH state upon receipt of a Traffic Volume Measurement Report for Event 4a.

Figure 4A:
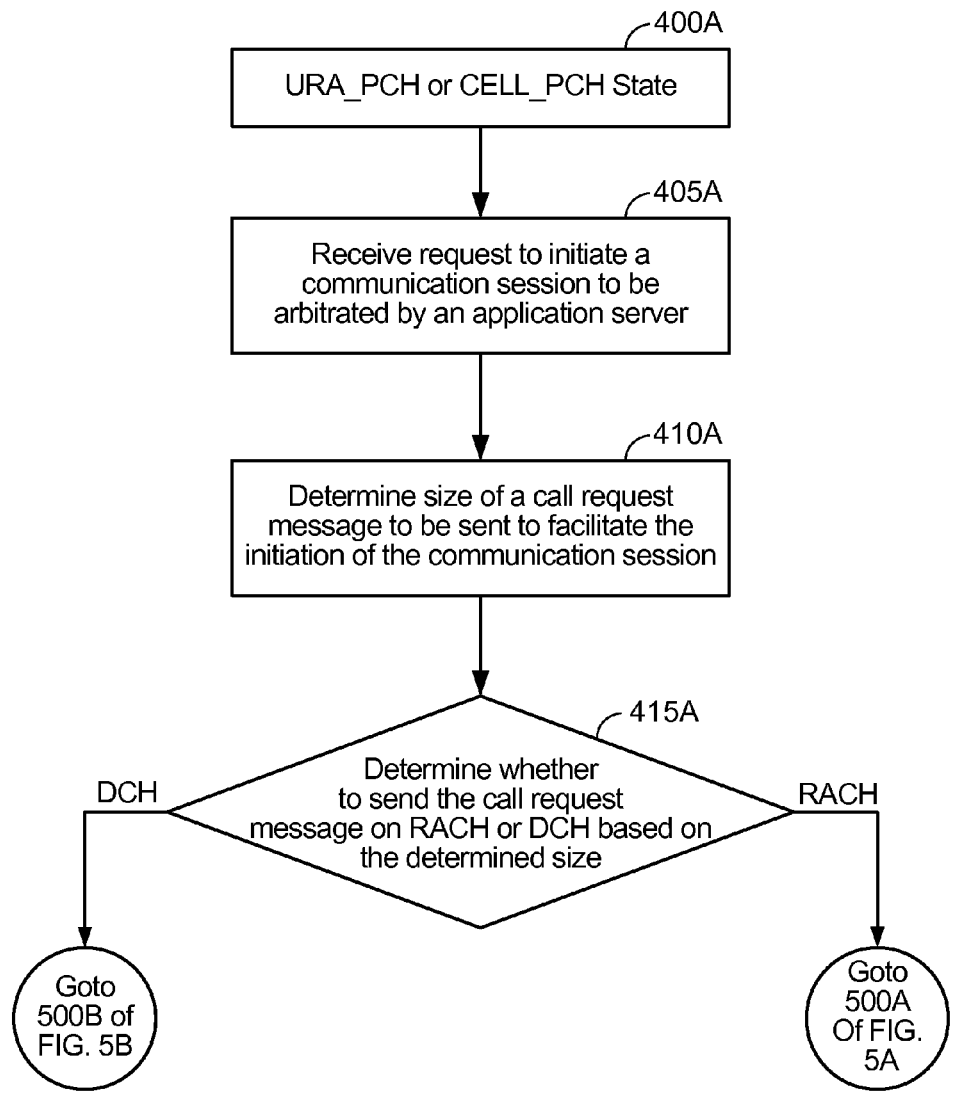
FIG. 4A illustrates a state decision process that is implemented at an originating user equipment (UE) within a wireless communication system in accordance with at least one embodiment of the invention.
Figure 4B:
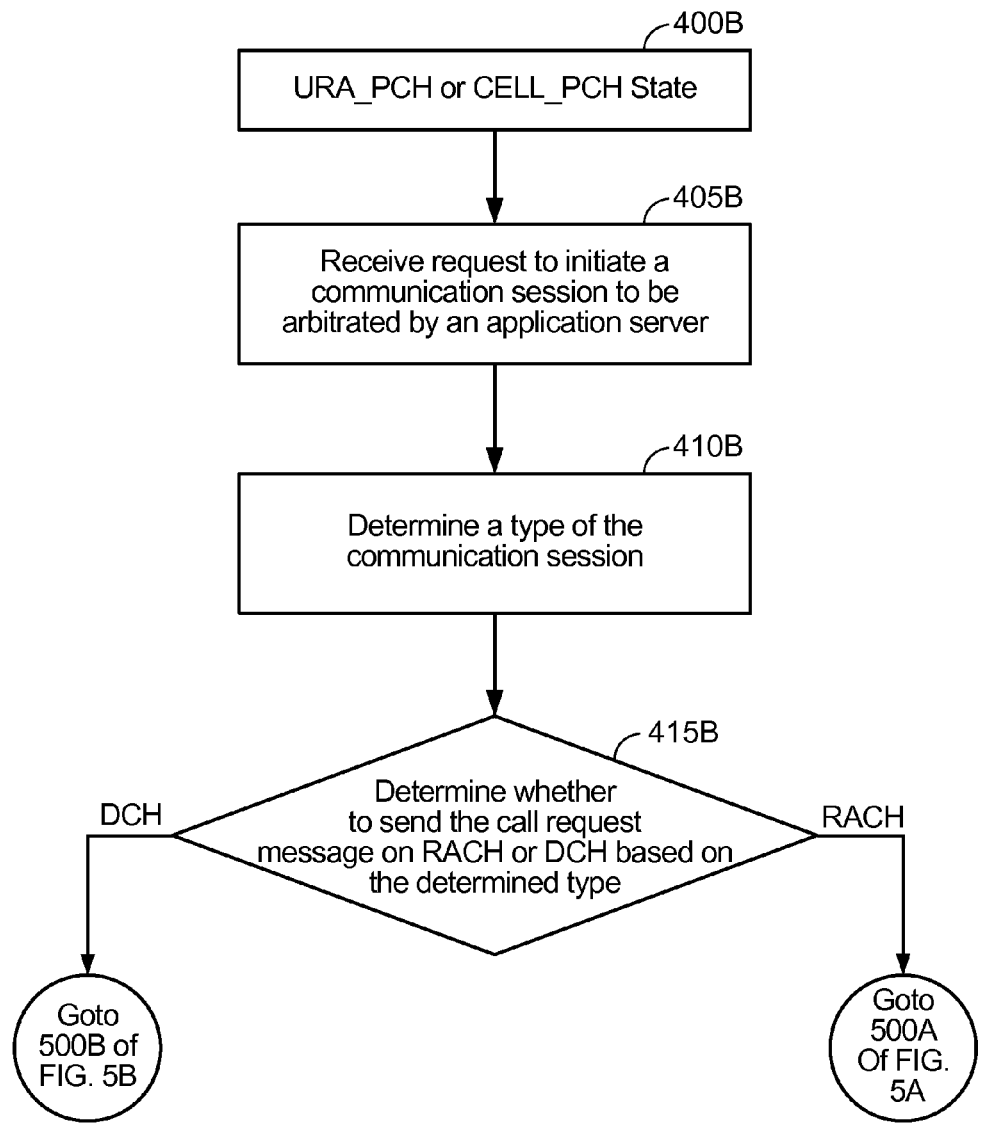
FIG. 4B illustrates another state decision process that is implemented at an originating user equipment (UE) within a wireless communication system in accordance with at least one embodiment of the invention.

Accordingly, embodiments of the invention are directed to a UE-assisted state transition, whereby an originating UE selectively includes a TVI in a cell update message based on a size of a call request message to be sent to the application server 170 (e.g., as in FIG. 4A), and/or based upon a type of the communication session to be initiated (e.g., as in FIG. 4B). In the embodiment of FIG. 4A, for example, the originating UE uses a size threshold in determining whether a particular call request message should be sent on the RACH or a DCH. In an example, the size threshold is less than the Event 4a threshold(s) that are already established at the RAN 120 for triggering CELL_DCH state transitions for UEs. In the embodiment of FIG. 4B, for example, the originating UE uses a determined type of the communication session (e.g., PTT, VoIP, etc.) in determining whether a particular call request message should be sent on the RACH or a DCH. Accordingly, the originating UE itself can control whether the RAN 120 transitions the originating UE to CELL_DCH or CELL_FACH based on its own comparison of the size of the call request message to the size threshold and/or a call or session-type determination.

Below, FIGS. 4A-5B illustrate UE-state transition processes wherein the system 100 corresponds to a Universal Mobile Telecommunications System (UMTS) that uses Wideband Code Division Multiple Access (W-CDMA) in accordance with embodiments of the invention. However, it will be appreciated by one of ordinary skill in the art how FIGS. 4A-5B can be directed to communication sessions in accordance with protocols other than W-CDMA. Further, certain signaling messages referred to herein are described whereby the application server 170 corresponds to a PTT server. However, it will be appreciated that other embodiments can be directed to servers providing services other than PTT to UEs of the system 100 (e.g., push-to-transfer (PTX) services, VoIP services, group-text sessions, etc.).

FIG. 4A illustrates a state decision process that is implemented at an originating UE within a wireless communication system. Referring to FIG. 4A, assume that a given UE ("originating UE") is operating in either URA_PCH or CELL_PCH state, 400A. While in URA_PCH or CELL_PCH state, the originating UE receives a request to initiate a communication session to be arbitrated by the application server 170, 405A. For example, the received request of 405A can correspond to a multimedia client application or API being executed on the originating UE receiving an indication that a user of the originating UE has pushed a PTT button to initiate a PTT communication session.

Next, the originating UE determines a size of a call request message to be sent for the initiation of the communication session, 410A. For example, call request messages for different communication session can have different sizes (i.e., different numbers of bits). For example, the type of call to be arbitrated by the application server 170 can affect the size of the call request message (e.g., VoIP session, PTT session, PTX session, etc.). If the call corresponds to a group communication session with a group of at least equal to a threshold size (e.g., three or more participants), the size of the group that the originating UE desires to engage with in the communication session can also affect the size of the call request message (e.g., large ad-hoc groups may have larger call request message sizes, etc.). In another example, call request messages may optionally be bundled with location-information of the originating UE to facilitate location-based decisions at the application server 170, and this type of location information increases the size of the call request message.

After determining the size of the call request message in 410A, the originating UE compares the determined size in 410A with a given size threshold in order to determine whether to send the call request message on the RACH in CELL_FACH state or on a DCH or E-DCH in CELL_DCH state, 415A. In particular, if the size of the call request message is determined not to be above the given size threshold, the decision of 415A determines to send the call request message on the RACH and the process advances to 500A of FIG. 5A. Otherwise, if the size of the call request message is determined to be above the given size threshold, the decision of 415A determines to send the call request message on the DCH or E-DCH and the process advances to 500B of FIG. 5B.

In an example, the given size threshold used by the originating UE to select between CELL_DCH state and CELL_FACH state for the transmission of the call request message can be based in part on how quickly the RAN 120 is expected to allocate DCH resources to the originating UE after the originating UE transmits a cell update message. As will be appreciated by one of ordinary skill in the art, if the RAN 120 is expected to accomplish the DCH allocation relatively quickly, the given size threshold can be set to a relatively low value. Likewise, if the RAN 120 is expected to accomplish the DCH allocation relatively slowly, the given size threshold can be set to a relatively high value. However, in at least one embodiment the given size threshold will not be set higher than the Event 4a threshold(s) (e.g., the uplink Event 4a threshold, the Event 4a threshold for triggering a TVM report, etc.) since the Event 4a threshold(s) would trigger a CELL_DCH state transition to the RAN 120 in any case.

While not shown explicitly in FIG. 4A, the originating UE can be informed of the given size threshold for the originating UE's serving RAN by the application server 170. In an example, before the process of FIG. 4A is executed, the originating UE reports an identifier of the UE's current serving network (e.g., a PLMN ID) to the application server 170. An operator of the application server 170 then determines the performance expectation of the UE's serving RAN (e.g., based on a look-up table that is established based on historical performance data of various networks), and sets the given size threshold for the originating UE based on the performance expectation. The given size threshold is then relayed to the originating UE. If the originating UE moves to a new serving network or RAN, the process can be repeated to update the given size threshold to a new value.

While FIG. 4A primarily relies upon an estimation of the size of the call message in determining whether the UE is to transmit the call message on the DCH or RACH, FIG. 4B is directed to an embodiment whereby the type of the communication session being initiated (e.g., PTT, VoIP, etc.) is used by the UE to select a reverse-link channel upon which to transmit the call message.

FIG. 4B illustrates a state decision process that is implemented at an originating UE within a wireless communication system in accordance with another embodiment of the invention. Referring to FIG. 4B, assume that a given UE ("originating UE") is operating in either URA_PCH or CELL_PCH state, 400B. While in URA_PCH or CELL_PCH state, the originating UE receives a request to initiate a communication session to be arbitrated by the application server 170, 405B. For example, the received request of 405B can correspond to a multimedia client application or API being executed on the originating UE receiving an indication that a user of the originating UE has pushed a PTT button to initiate a PTT communication session.

Next, the originating UE determines the type of communication session that was requested in 405B, 410B. For example, the originating UE may be capable of engaging in a number of different types of communication sessions, such as conventional voice calls, PTT or PTX sessions, VoIP sessions, and so on. These different communication session types may be associated with different requirements in terms of session set-up, such as delay sensitivity. PTT sessions are known to be particularly delay-sensitive, for instance.

After determining the type of the communication session in 410B, the originating UE compares the determined type in 410B with a given list of session types in order to determine whether to send the call request message on the RACH in CELL_FACH state or on a DCH or E-DCH in CELL_DCH state, 415B. In an example, the given list of session types can be established such that when the comparison indicates that the determined type is present on the given list, the originating UE selects the DCH or E_DCH upon which to transmit the call request message. In this case, the given list of session types may correspond to relatively delay-sensitive communication sessions, such as PTT or PTX sessions. Alternatively, the given list of session types can be established such that when the comparison indicates that the determined type is present on the given list, the originating UE selects the RACH upon which to transmit the call request message. In this case, the given list of session types may correspond to communication sessions that are not particularly delay sensitive, such as conventional calls or VoIP sessions.

Figure 5A:
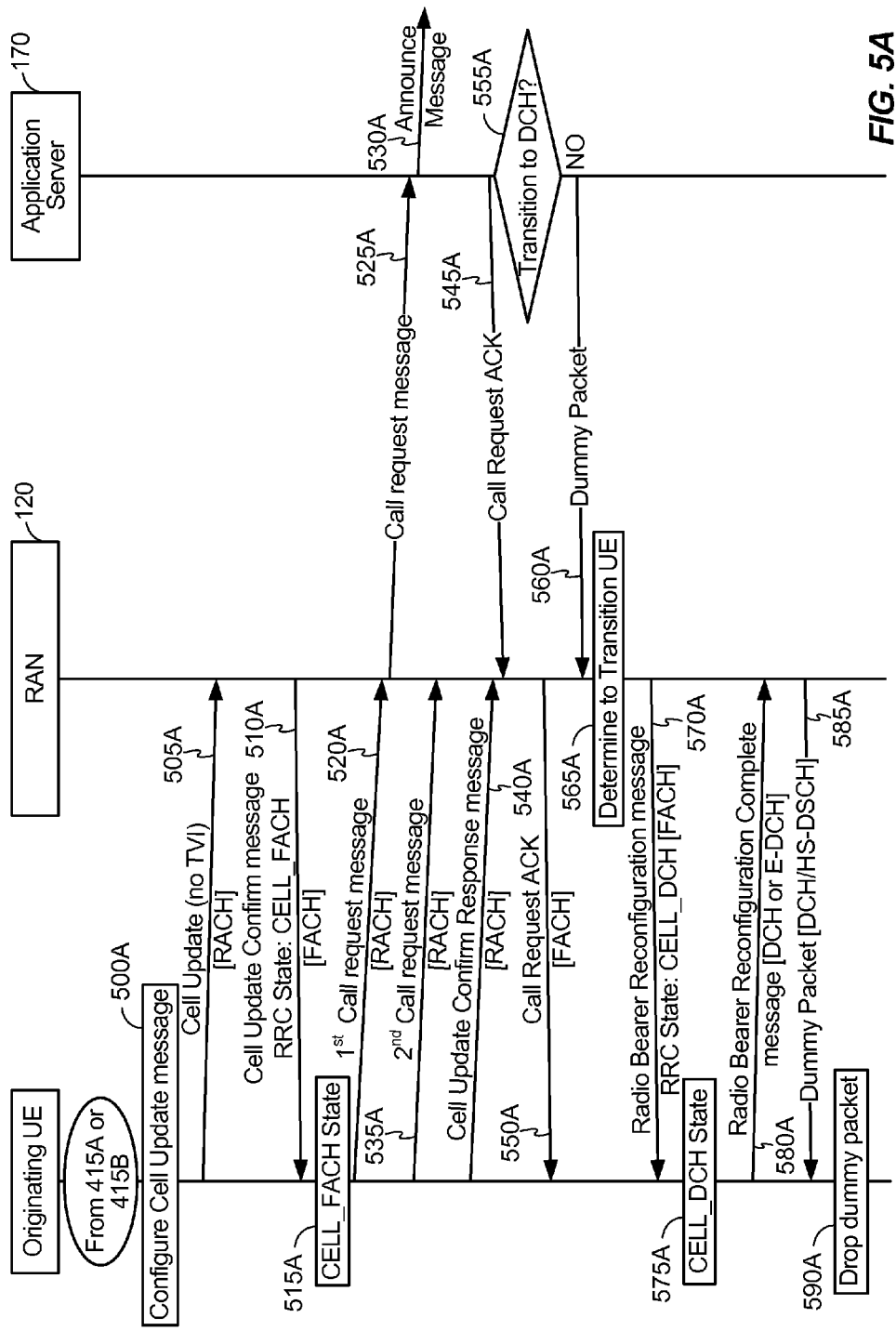
FIG. 5A illustrates a continuation of the process of FIG. 4A or FIG. 4B in accordance with at least one embodiment of the invention.

Referring to FIG. 4B, if the decision of 415B determines to send the call request message on the RACH, the process advances to 500A of FIG. 5A. Otherwise, if the decision of 415B determines to send the call request message on the DCH or E-DCH, the process advances to 500B of FIG. 5B.

Referring to FIG. 5A, after determining to transmit the call request message from the originating UE on the RACH in CELL_FACH state in 415A of FIG. 4A or 415B of FIG. 4B, the originating UE configures a cell update message without a TVI so that the RAN 120 does not transition the originating UE to CELL_DCH state, 500A. For example, as discussed above, in W-CDMA Rel. 6, a new feature referred to as a TVI is introduced, whereby the originating UE has the option of including the TVI within the cell update message during a cell update procedure to control how the RAN 120 will evaluate an Event 4a condition. Accordingly, aside from determining the call-type of the communication session and/or inferring the size of the call request message from the call-type (e.g., inferring a small message-size for direct calls, inferring a large message-size for adhoc-group calls, etc.) in 410A of FIG. 4A or 410B or FIG. 4B, the originating UE can also determine the TVI setting for the cell update message based on the associated call-type to be initiated by the call request message. For example, the configuration of 500A (TVI=False or TVI=0) can be responsive to detecting the call-type of the call request message corresponding to a direct call.

Accordingly, the originating UE transmits the cell update message without the TVI on the RACH to the RAN 120, 505A, and the RAN 120 responds to the cell update message by sending a cell update confirm message on the FACH that instructs the originating UE to transition into CELL_FACH state, 510A. As will be appreciated by one of ordinary skill in the art, transitions from URA_PCH or CELL_PCH state into CELL_FACH state do not require a radio link (RL) to be set-up between a serving Node B and a serving RNC at the RAN 120, such that the cell update confirm message of 510A can be sent relatively quickly as compared to a cell update message instructing a UE to transition to CELL_DCH state).

The originating UE receives the cell update confirm message of 510A and transitions to CELL_FACH state, 515A. Conventionally, upon receiving a cell update confirm message from the RAN 120, the originating UE would respond with a cell update confirm response message, after which the originating UE would be permitted to send data on the RACH to the RAN 120. In the embodiment of FIG. 5A, however, the originating UE and RAN 120 are configured to permit the originating UE to transmit data before the cell update confirm response message is sent. As will be appreciated, sending the call request message(s) before the cell update confirm response message can result in an earlier transmission of data, but is not necessarily an essential feature in each embodiment of the invention.

Accordingly, before a cell update confirm response message is sent on the RACH to the RAN 120, the originating UE transmits a first call request message on the RACH to the RAN 120, 520A, and the RAN 120 forwards the call request message to the application server 170, 525A. Upon receiving the call request message and locating the associated call target(s), the application server 170 announces the communication session to each call target, 530A. The originating UE repeats the call request message at a given interval at least until the call request message is ACKed by the application server 170, and as such a second call request message is sent by the originating UE in 535A.

After sending the call request messages of 520A and 535A, the originating UE sends the cell update confirm response message on the RACH to the RAN 120, 540A. As noted above, the transmission of the cell update confirm response message would conventionally occur prior to transmission of data on the RACH, whereas the originating UE and RAN 120 are specially configured to permit an 'early' transmission of data on the RACH in the embodiment of FIG. 5A.

Turning back to the application server 170, after decoding the call request message from 525A, the application server 170 sends a call request ACK to the RAN 120 for transmission to the originating UE, 545A. The RAN 120 receives the call request ACK from the application server 170 and transmits the call request ACK to the originating UE on the FACH, 550A. While the call request ACK is shown as occurring after the announce message is sent in 530A, it will be appreciated that the call request ACK can be sent concurrently with or before the announce message in other embodiments of the invention.

As will be appreciated by one of ordinary skill in the art, the application server 170 is generally unaware of whether the originating UE is connected to the RAN 120 in CELL_FACH state or CELL_DCH state. However, to improve performance and reliability during the communication session, the application server 170 will generally desire to maintain the originating UE in CELL_DCH state. Therefore, in an embodiment of the invention, the application server 170 is configured to evaluate (i) the size of the call request message received at 525A and/or (ii) the type of communication session requested for initiation to infer whether originating UE is expected to already be operating in CELL_DCH state, 555A. For example, in 555A, the evaluation of the application server 170 can correspond to comparing the size of the call request message to the given size threshold, similar to 415A of FIG. 4A at the originating UE. For example, as noted above, before the process of FIG. 4A (or FIG. 5A) is executed, the originating UE can report its current serving network to the application server 170 (e.g., by conveying a PLMN ID of the serving network to the application server 170). The application server 170 can then set the given size threshold for the originating UE based on the UE's serving network. Thereafter, the application server 170 will assume that the originating UE will have transitioned itself to CELL_DCH state when a message having a size greater than the given size threshold and/or one or more of the Event 4a thresholds of the UE's serving network is received at the application server 170 from the originating UE. In an alternative example, in 555A, the evaluation of the application server 170 can correspond to comparing the type of the communication session to a given list of communication session types, similar to 415B of FIG. 4B at the originating UE.

In the embodiment of FIG. 5A, the application server 170 determines to facilitate the transmission of the originating UE to CELL_DCH state by transmitting a dummy packet to the originating UE, with the dummy packet having a size that is greater than or equal to the DL Event 4a threshold for the UE, 560A. For example, the application server 170's determination to transition the originating UE to CELL_DCH state can be responsive to the call request message being less than or equal to the given size threshold and/or based upon the type of communication session being initiated by the originating UE. Thus, the dummy packet is set to be large enough to trigger the RAN 120's own CELL_DCH state transition mechanism for the originating UE.

In another embodiment of the invention, the application server 170 can simply send the dummy packet to the originating UE whenever a call request message is received without performing the evaluation of 555A. While simpler in terms of implementation, it will be appreciated that this will result in at least some dummy packets being sent unnecessarily in the sense that the originating UE was already in the CELL_DCH state (e.g., although in FIG. 5A, the UE was not yet in CELL_DCH state until after the transmission of the dummy packet).

Referring to FIG. 5A, the RAN 120 (specifically, the serving RNC of the RAN 120) receives the dummy packet and determines to transition the originating UE to CELL_DCH state based on the dummy packet causing the downlink traffic volume to rise above the Event 4a TVM threshold, 565A. Accordingly, after establishing a radio link (RL) between the serving Node B and the serving RNC at the RAN 120 for the DCH, the RAN 120 transmits a radio bearer (RB) reconfiguration message to the originating UE over the FACH, 570A. As will be appreciated, while illustrated as a RB reconfiguration message in 570A, this reconfiguration message could alternatively be configured as a Transport Channel (TCH) Reconfiguration message or a Physical Channel (PCH) Reconfiguration message, based on whether the Radio Bearer, Transport Channel or Physical Channel is the higher layer of the originating UE to be reconfigured.

The originating UE receives the RB reconfiguration message and transitions to CELL_DCH state, 575A. While not shown explicitly in FIG. 5A, the originating UE's transition to CELL_DCH may include completing a L1 synchronization procedure with its serving Node B, after which the originating UE transmits a RB reconfiguration complete message on the DCH or E-DCH to the RAN 120, 580A. The RAN 120 then transmits the dummy packet to the originating UE on the DCH or HS-DSCH, 585A, and the originating UE decodes and then drops the dummy packet, 590A.

Figure 5B:
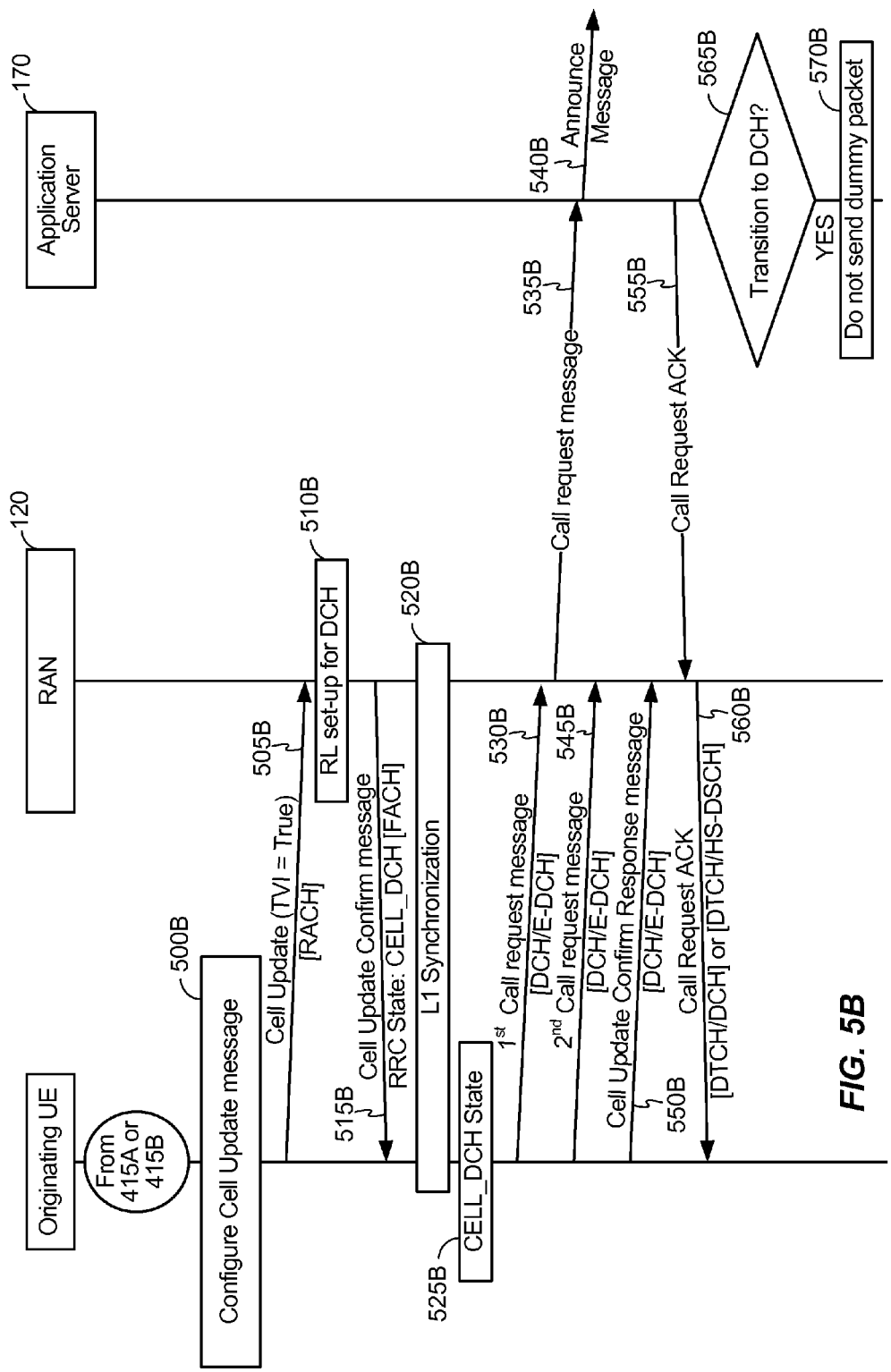
FIG. 5B illustrates another continuation of the process of FIG. 4A or FIG. 4B in accordance with at least one embodiment of the invention.

Referring to FIG. 5B, after determining to transmit the call request message from the originating UE on a DCH (i.e., DCH or E-DCH) in CELL_DCH state in 415A of FIG. 4A or 415B or FIG. 4B, the originating UE configures a cell update message with a TVI (i.e., TVI=True) so that the RAN 120 is prompted to transition the originating UE to CELL_DCH state, 500B. For example, as discussed above, in W-CDMA Rel. 6, a new feature referred to as a TVI is introduced, whereby the originating UE has the option of including the TVI within the cell update message during a cell update procedure to control how the RAN 120 will evaluate an Event 4a condition. Accordingly, aside from determining the call-type of the communication session and/or inferring the size of the call request message from the call-type (e.g., inferring a small message-size for direct calls, inferring a large message-size for adhoc-group calls, etc.) in 410A of FIG. 4A or 410B of FIG. 4B, the originating UE can also determine the TVI setting for the cell update message based on the associated call-type to be initiated by the call request message. For example, the configuration of 500A (TVI=False or TVI=j) can be responsive to detecting the call-type of the call request message corresponding to an adhoc-group call (e.g., as in FIG. 4B) and/or based upon a direct estimation of the size of the call request message itself (e.g., as in FIG. 4A).

Accordingly, the originating UE transmits the cell update message with the TVI (i.e., TVI=True) on the RACH to the RAN 120, 505B. The RAN 120 responds to the cell update message by setting up a radio link (RL) between the serving Node B and the serving RNC, 510B, after which the RAN 120 sends a cell update confirm message on the FACH that instructs the originating UE to transition into CELL_DCH state, 515B. As will be appreciated by one of ordinary skill in the art, unlike transitions from URA_PCH or CELL_PCH state into CELL_FACH state, transitions from URA_PCH or CELL_PCH state into CELL_DCH state require a radio link (RL) to be set-up between a serving Node B and a serving RNC at the RAN 120, such that the cell update confirm message of 515B is sent after a given RAN-processing delay associated with RL set-up.

The originating UE receives the cell update confirm message of 515B and begins its transition to CELL_DCH by performing a L1 synchronization procedure with its serving Node B, 520B. After completing the L1 synchronization procedure of 520B, the originating UE is considered to be operating in CELL_DCH state, 525B. Conventionally, after completing the L1 synchronization procedure, the originating UE would transmit a cell update confirm response message, after which the originating UE would be permitted to send data on the reverse-link DCH or E-DCH to the RAN 120. In the embodiment of FIG. 5B, however, the originating UE and RAN 120 are configured to permit the originating UE to transmit data after the L1 synchronization procedure and before the cell update confirm response message is sent. As will be appreciated, sending the call request message(s) before the cell update confirm response message can result in an earlier transmission of data, but is not necessarily an essential feature in each embodiment of the invention.

Accordingly, before a cell update confirm response message is sent on the reverse-link DCH or E-DCH to the RAN 120, the originating UE transmits a first call request message on the reverse-link DCH or E-DCH to the RAN 120, 530B, and the RAN 120 forwards the call request message to the application server 170, 535B. Upon receiving the call request message and locating the associated call target(s), the application server 170 announces the communication session to each call target, 540B. The originating UE repeats the call request message at a given interval at least until the call request message is ACKed by the application server 170, and as such a second call request message is sent by the originating UE in 545B.

After sending the call request messages of 530B and 545B, the originating UE sends the cell update confirm response message on the reverse link DCH or E-DCH to the RAN 120, 550B. As noted above, the transmission of the cell update confirm response message would conventionally occur prior to transmission of data on the reverse-link DCH or E-DCH, whereas the originating UE and RAN 120 are specially configured to permit an 'early' transmission of data on the DCH or E-DCH in the embodiment of FIG. 5B.

Turning back to the application server 170, after decoding the call request message from 535B, the application server 170 sends a call request ACK to the RAN 120 for transmission to the originating UE, 555B. The RAN 120 receives the call request ACK from the application server 170 and transmits the call request ACK to the originating UE on the DTCH/DCH or DTCH/HS-DSCH, 560B. While the call request ACK is shown as occurring after the announce message is sent in 540B, it will be appreciated that the call request ACK can be sent concurrently with or before the announce message in other embodiments of the invention.

As noted above, the application server 170 is generally unaware of whether the originating UE is connected to the RAN 120 in CELL_FACH state or CELL_DCH state. However, to improve performance and reliability during the communication session, the application server 170 will generally desire to maintain the originating UE in CELL_DCH state. Therefore, in an embodiment of the invention, the application server 170 is configured to evaluate the size of the call request message received at 535B (e.g., similar to FIG. 4A at the originating UE) and/or the call-type of the communication session being initiated (e.g., similar to FIG. 4B at the originating UE) to infer whether the originating UE is expected to already be operating in CELL_DCH state, 565B. For example, in 565B, the evaluation of the application server 170 can correspond to comparing the size of the call request message to the given size threshold, similar to 415A of FIG. 4A at the originating UE. In an alternative example, in 565B, the evaluation of the application server 170 can correspond to comparing the call-type of the communication session being initiated to a given list of communication session types, similar to 415B of FIG. 4B at the originating UE.

In the embodiment of FIG. 5B, the application server 170 determines that the originating UE is likely already operating in CELL_DCH state (e.g., because the call request message is above the given size threshold and/or the call-type of the communication session is either listed or not-listed on the given list), and thereby refrains from transmitting the dummy packet, 570B. In particular, FIG. 5B demonstrates an example whereby 'blindly' sending dummy packets from the application server 170 to originating UEs responsive to call request messages is not truly necessary because the originating UE, in this embodiment at least, is already in CELL_DCH state at this point.

While references in the above-described embodiments of the invention have generally used the terms 'call' and 'session' interchangeably, it will be appreciated that any call and/or session is intended to be interpreted as inclusive of actual calls between different parties, or alternatively to data transport sessions that technically may not be considered as 'calls'. Also, while above-embodiments have generally described with respect to PTT sessions, other embodiments can be directed to any type of communication session, such as a push-to-transfer (PTX) session, an emergency VoIP call, etc.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of selectively transitioning a state of a user equipment (UE) within a wireless communications system, comprising:
   determining, at the UE, to initiate a communication session with at least one other UE to be arbitrated by an application server;
   determining a size of a call message to be sent by the UE for requesting initiation of the communication session by the application server, wherein the determined size of the call message indicates that a traffic volume to be transmitted by the UE does not exceed a reverse-link traffic volume measurement threshold configured to trigger a transition of the UE to a dedicated-channel state;
   selecting a reverse-link dedicated channel as a reverse-link channel on which to transmit the call message based at least in part upon the determined size of the call message even though the traffic volume to be transmitted by the UE does not exceed the reverse-link traffic volume measurement threshold;
   transitioning the UE to the dedicated-channel state that supports transmissions upon the selected reverse-link dedicated channel by falsely indicating, to a serving access network of the UE, that the traffic volume to be transmitted by the UE exceeds the reverse-link traffic volume measurement threshold; and
   transmitting the call message on the selected reverse-link dedicated channel after the UE is transitioned to the dedicated-channel state.

2. The method of claim 1, wherein the determining to initiate the communication session step is in response to a request from a user of the UE to initiate the communication session.

3. The method of claim 1, wherein the determined size of the call message is based at least in part upon a wireless communications protocol associated with the communication session and/or whether supplemental information is bundled with the call message.

4. The method of claim 3, wherein the wireless communications protocol corresponds to Voice-over Internet Protocol (VoIP), Push-to-Talk (PTT) or Push-to-Transfer (PTX).

5. The method of claim 3, wherein the supplemental information includes location information associated with the UE.

6. The method of claim 1, wherein the selecting step includes:
   comparing the determined size of the call message with a size threshold; and
   selecting the reverse-link dedicated channel as the reverse-link channel on which to transmit the call message in response to the comparison indicating that the determined size is not below the size threshold.

7. The method of claim 6, wherein the selecting is configured to select a reverse-link shared channel as the reverse-link channel for call messages with sizes that are below the size threshold.

8. The method of claim 7, wherein the reverse-link shared channel corresponds to a random access channel (RACH).

9. The method of claim 6, wherein the size threshold is configured such that, when factoring in overhead, data packets below the size threshold are expected to be capable of completing transmission more quickly upon a reverse-link shared channel and data packets that are not below the size threshold are expected to be capable of completing transmission more quickly upon the selected reverse-link dedicated channel.

10. The method of claim 6,
wherein the size threshold is no larger than the reverse-link traffic volume measurement threshold, and
wherein the reverse-link traffic volume measurement threshold is an Event 4a Traffic Volume Measurement (TVM) threshold of the serving access network of the UE.

11. The method of claim 6, wherein the size threshold is conveyed to the UE from the serving access network.

12. The method of claim 1, wherein the UE is in an idle state when the UE determines to initiate the communication session.

13. The method of claim 1, wherein the transitioning step includes:
configuring a message including the false traffic volume indication to request the serving access network to transition the UE to the dedicated-channel state; and
transmitting the configured message to the serving access network on a given reverse-link channel.

14. The method of claim 13, wherein the given reverse-link channel corresponds to the selected reverse-link dedicated channel.

15. The method of claim 13, wherein the given reverse-link channel does not correspond to the selected reverse-link dedicated channel.

16. The method of claim 13,
wherein the configured message corresponds to a Cell Update message, and
wherein the configuring step sets a value of a Traffic Volume Indicator (TVI) field within the Cell Update message that instructs the serving access network to transition the UE to the dedicated-channel state via the false traffic volume indication.

17. The method of claim 16,
wherein the TVI field is set to "TVI=True" instead of "no TVI" in order to trigger the transition of the UE to CELL_DCH state.

18. The method of claim 1, wherein the selecting is configured to select a reverse-link shared channel for delivery of one or more different call request messages that have sizes that are less than both the reverse-link traffic volume measurement threshold and a separate size threshold.

19. The method of claim 18, wherein the reverse-link shared channel for delivery of the one or more different call request messages corresponds to a random access channel (RACH).

20. A method of selectively transitioning a state of a user equipment (UE) within a wireless communications system, comprising:
determining, at the UE, to initiate a communication session with at least one other UE to be arbitrated by an application server;
determining a type of the communication session;
selecting, based at least in part upon the determined type of the communication session, a reverse-link dedicated channel as a reverse-link channel on which to transmit a call message for requesting initiation of the communication session by the application server;
transitioning the UE to a dedicated-channel state that supports transmissions upon the selected reverse-link dedicated channel by indicating, to a serving access network of the UE irrespective of whether a traffic volume to be transmitted by the UE actually exceeds a reverse-link traffic volume measurement threshold configured to trigger a transition of the UE to the dedicated-channel state, that the traffic volume to be transmitted by the UE exceeds the reverse-link traffic volume measurement threshold; and
transmitting the call message on the selected reverse-link dedicated channel after the UE is transitioned to the dedicated-channel state.

21. The method of claim 20, wherein the determining to initiate the communication session step is in response to a request from a user of the UE to initiate the communication session.

22. The method of claim 20, wherein the determined type of the communication session corresponds to Voice-over Internet Protocol (VoIP), Push-to-Talk (PTT) or Push-to-Transfer (PTX).

23. The method of claim 20, wherein the selecting step includes:
comparing the determined type of the communication session with a list of session types; and
selecting the reverse-link dedicated channel as the reverse-link channel on which to transmit the call message based on whether the comparison indicates that the determined type corresponds to one or more session types of the list of session types.

24. The method of claim 23, wherein selecting is configured to select a reverse-link shared channel as the reverse-link channel for call messages associated with one or more different communication session types.

25. The method of claim 24, wherein the reverse-link shared channel corresponds to a random access channel (RACH).

26. The method of claim 23, wherein the list of session types includes either a list of communication session types that are delay-sensitive, or a list of communication session types that are not delay-sensitive.

27. The method of claim 20, wherein the UE is in an idle state when the UE determines to initiate the communication session.

28. The method of claim 20, wherein the transitioning step includes:
configuring a message to request a serving access network to transition the UE to the dedicated-channel state by indicating that the traffic volume to be transmitted by the UE exceeds the reverse-link traffic volume measurement threshold; and
transmitting the configured message to the serving access network on a given reverse-link channel.

29. The method of claim 28, wherein the given reverse-link channel corresponds to the selected reverse-link dedicated channel.

30. The method of claim 28, wherein the given reverse-link channel does not correspond to the selected reverse-link dedicated channel.

31. The method of claim 28,
wherein the configured message corresponds to a Cell Update message, and
wherein the configuring step sets a value of a Traffic Volume Indicator (TVI) field within the Cell Update message that instructs the serving access network to transition the UE to the dedicated-channel state by indicating that the traffic volume to be transmitted by the UE exceeds the reverse-link traffic volume measurement threshold.

32. The method of claim 31,
wherein the TVI field is set to "TVI=True" instead of "no TVI" in order to trigger the transition of the UE to CELL_DCH state.

33. The method of claim 20, wherein the selecting is configured to select a reverse-link shared channel for delivery of one or more different call messages associated with one or more different communication session types.

34. The method of claim 33, wherein the reverse-link shared channel corresponds to a random access channel (RACH).

35. A user equipment (UE) within a wireless communications system, comprising:
means for determining to initiate a communication session with at least one other UE to be arbitrated by an application server;
means for determining a size of a call message to be sent by the UE for requesting initiation of the communication session by the application server, wherein the determined size of the call message indicates that a traffic volume to be transmitted by the UE does not exceed a reverse-link traffic volume measurement threshold configured to trigger a transition of the UE to a dedicated-channel state;
means for selecting a reverse-link dedicated channel as a reverse-link channel on which to transmit the call message based at least in part upon the determined size of the call message even though the traffic volume to be transmitted by the UE does not exceed the reverse-link traffic volume measurement threshold;
means for transitioning the UE to the dedicated-channel state that supports transmissions upon the selected reverse-link dedicated channel by falsely indicating, to a serving access network of the UE, that the traffic volume to be transmitted by the UE exceeds the reverse-link traffic volume measurement threshold; and
means for transmitting the call message on the selected reverse-link dedicated channel after the UE is transitioned to the dedicated-channel state.

36. A user equipment (UE) within a wireless communications system, comprising:
means for determining to initiate a communication session with at least one other UE to be arbitrated by an application server;
means for determining a type of the communication session;
means for selecting, based at least in part upon the determined type of the communication session, a reverse-link dedicated channel as a reverse-link channel on which to transmit a call message for requesting initiation of the communication session by the application server;
means for transitioning the UE to a dedicated-channel state that supports transmissions upon the selected reverse-link dedicated channel by indicating, to a serving access network of the UE irrespective of whether a traffic volume to be transmitted by the UE actually exceeds a reverse-link traffic volume measurement threshold configured to trigger a transition of the UE to the dedicated-channel state, that the traffic volume to be transmitted by the UE exceeds the reverse-link traffic volume measurement threshold; and
means for transmitting the call message on the selected reverse-link dedicated channel after the UE is transitioned to the dedicated-channel state.

37. A user equipment (UE) within a wireless communications system, comprising:
logic configured to determine to initiate a communication session with at least one other UE to be arbitrated by an application server;
logic configured to determine a size of a call message to be sent by the UE for requesting initiation of the communication session by the application server, wherein the determined size of the call message indicates that a traffic volume to be transmitted by the UE does not exceed a reverse-link traffic volume measurement threshold configured to trigger a transition of the UE to a dedicated-channel state;
logic configured to select a reverse-link dedicated channel as a reverse-link channel on which to transmit the call message based at least in part upon the determined size of the call message even though the traffic volume to be transmitted by the UE does not exceed the reverse-link traffic volume measurement threshold;
logic configured to transition the UE to the dedicated-channel state that supports transmissions upon the selected reverse-link dedicated channel by falsely indicating, to a serving access network of the UE, that the traffic volume to be transmitted by the UE exceeds than the reverse-link traffic volume measurement threshold; and
logic configured to transmit the call message on the selected reverse-link dedicated channel after the UE is transitioned to the dedicated-channel state.

38. A user equipment (UE) within a wireless communications system, comprising:
logic configured to determine to initiate a communication session with at least one other UE to be arbitrated by an application server;
logic configured to determine a type of the communication session;
logic configured to select, based at least in part upon the determined type of the communication session, a reverse-link dedicated channel as a reverse-link channel on which to transmit a call message for requesting initiation of the communication session by the application server;
logic configured to transition the UE to a dedicated-channel state that supports transmissions upon the selected reverse-link dedicated channel by indicating, to a serving access network of the UE irrespective of whether a traffic volume to be transmitted by the UE actually exceeds a reverse-link traffic volume measurement threshold configured to trigger a transition of the UE to the dedicated-channel state, that the traffic volume to be transmitted by the UE exceeds the reverse-link traffic volume measurement threshold; and
logic configured to transmit the call message on the selected reverse-link dedicated channel after the UE is transitioned to the dedicated-channel state.

39. A non-transitory computer-readable storage medium containing instructions stored thereon, which, when executed by a user equipment (UE) within a wireless communications system, cause the UE to perform operations, the instructions comprising:

program code to determine to initiate a communication session with at least one other UE to be arbitrated by an application server;

program code to determine a size of a call message to be sent by the UE for requesting initiation of the communication session by the application server, wherein the determined size of the call message indicates that a traffic volume to be transmitted by the UE does not exceed a reverse-link traffic volume measurement threshold configured to trigger a transition of the UE to a dedicated-channel state;

program code to select a reverse-link dedicated channel as a reverse-link channel on which to transmit the call message based at least in part upon the determined size of the call message even though the traffic volume to be transmitted by the UE does not exceed the reverse-link traffic volume measurement threshold;

program code to transition the UE to the dedicated-channel state that supports transmissions upon the selected reverse-link dedicated channel by falsely indicating, to a serving access network of the UE, that the traffic volume to be transmitted by the UE exceeds the reverse-link traffic volume measurement threshold; and program code to transmit the call message on the selected reverse-link dedicated channel after the UE is transitioned to the dedicated-channel state.

40. A non-transitory computer-readable storage medium containing instructions stored thereon, which, when executed by a user equipment (UE) within a wireless communications system, cause the UE to perform operations, the instructions comprising:

program code to determine to initiate a communication session with at least one other UE to be arbitrated by an application server;

program code to determine a type of the communication session;

program code to select, based at least in part upon the determined type of the communication session, a reverse-link dedicated channel as a reverse-link channel on which to transmit a call message for requesting initiation of the communication session by the application server;

program code to transition the UE to a dedicated-channel state that supports transmissions upon the selected reverse-link dedicated channel by indicating, to a serving access network of the UE irrespective of whether a traffic volume to be transmitted by the UE actually exceeds a reverse-link traffic volume measurement threshold configured to trigger a transition of the UE to the dedicated-channel state, that the traffic volume to be transmitted by the UE exceeds the reverse-link traffic volume measurement threshold; and program code to transmit the call message on the selected reverse-link dedicated channel after the UE is transitioned to the dedicated-channel state.

* * * * *